US008095398B2

(12) United States Patent
Dellinger et al.

(10) Patent No.: US 8,095,398 B2

(45) **Date of Patent: *Jan. 10, 2012**

(54) METHOD AND APPARATUS FOR PROVIDING RETIREMENT INCOME BENEFITS

(75) Inventors: Jeffrey K. Dellinger, Fort Wayne, IN (US); Stephen H. Lewis, Fort Wayne, IN (US); Denis G. Schwartz, Fort Wayne, IN (US); Jason H. Rickard, Fort Wayne, IN (US)

(73) Assignee: Lincoln National Life Insurance Company, Fort Wayne, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/956,797

(22) Filed: Nov. 30, 2010

(65) Prior Publication Data

US 2011/0131149 A1 Jun. 2, 2011

Related U.S. Application Data

(60) Continuation of application No. 11/520,411, filed on Sep. 13, 2006, which is a division of application No. 09/804,667, filed on Mar. 12, 2001, now Pat. No. 7,376,608, which is a continuation-in-part of application No. 09/406,290, filed on Sep. 24, 1999, now Pat. No. 7,089,201.

(60) Provisional application No. 60/101,883, filed on Sep. 25, 1998, provisional application No. 60/115,570, filed on Jan. 12, 1999.

(51) Int. Cl.
*G06Q 40/00* (2012.01)

(52) U.S. Cl. ........................................................ 705/4

(58) Field of Classification Search ................. 705/4, 35
See application file for complete search history.

(56) References Cited

U.S. PATENT DOCUMENTS 5,893,071 A * 4/1999 Cooperstein ...................... 705/4
6,275,807 B1 * 8/2001 Schirripa .................... 705/36 R

* cited by examiner

*Primary Examiner* — Eric T Wong

(74) *Attorney, Agent, or Firm* — Barnes & Thornburg LLP

(57) ABSTRACT

A computerized method and system for administering an unannuitized variable annuity plan having a guaranteed minimum withdrawal payment feature associated with a systematic withdrawal program includes the steps of and system for storing data, determining an amount of a scheduled payment, periodically determining the account value, making the scheduled payment by withdrawing that amount from the account value, monitoring for an unscheduled withdrawal made under the plan and adjusting the amount of the scheduled payment in response to the unscheduled withdrawal. Scheduled payments will be made to the owner under the plan for the period of benefit payments, even if it is determined by the computerized method and system that the account value is or will be exhausted before all payments have been made. Payments made before such determination are made with the aid of the computer, and payments made thereafter may be made with or without the aid of the computer.

14 Claims, 16 Drawing Sheets

A
RETRIEVE UNIT VALUES AND ANNUNITY FACTORS 158
SCHEDULED WITHDRAWAL ? 160
PREMIUM OR DEPOSIT ? 170
UNSCHEDULED WITHDRAWAL ? 178
ERROR 180
NEW PROGRAM ? 162
CALCULATE ACTUAL RETURN (i) 166
CALCULATE ACCOUNT VALUE 172
CALCULATE ACCOUNT VALUE 182
CALCULATE INITIAL WITHDRAWAL AMOUNT 164
CALCULATE WITHDRAWAL AMOUNT 168
CALCULATE INCREASE FACTOR 174
CALCULATE DECREASE FACTOR 184
INCREASE SCHEDULED WITHDRAWAL AMOUNT 176
DECREASE SCHEDULED WITHDRAWAL AMOUNT 186
CONVERT TRANSACTION AMOUNT INTO NUMBER OF UNITS 188
ADJUST NUMBER OF UNITS IN ACCOUNT 190
UPDATE MASTER RECORD 192
E

| Contract Value | | | |
|---|---|---|---|
| Contract Year | Net Inv. Return | Variable Contract | Fixed Contract |
| 0 | - | 10,000 | 10,000 |
| 1 | 10% | 11,000 | 10,500 |
| 2 | 5% | 11,550 | 11,025 |
| 3 | - 2% | 10,164 | 11,576 |
| 4 | 25% | 12,705 | 12,155 |
| 5 | 14% | 14,484 | 12,763 |
| 6 | 11% | 16,077 | 13,401 |
| 7 | 2% | 16,398 | 14,071 |
| 8 | -5% | 15,579 | 14,775 |
| 9 | 4% | 16,202 | 15,513 |
| 10 | 23% | 19,928 | 16,289 |
| 11 | 18% | 23,515 | 17,103 |
| 12 | 0% | 23,515 | 17,959 |
| 13 | -7% | 21,869 | 18,856 |
| 14 | -3% | 21,213 | 19,799 |
| 15 | 10% | 23,334 | 20,789 |

| Contract Year | Accumulation Unit Value[1] | Annuity Unit Value[2] |
|---|---|---|
| 0 | 1.00000 | 1.00000 |
| 1 | 1.09000 | 1.03810 |
| 2 | 1.18810 | 1.07764 |
| 3 | 1.29503 | 1.11869 |
| 4 | 1.41158 | 1.16131 |
| 5 | 1.53862 | 1.20555 |
| 6 | 1.67710 | 1.25148 |
| 7 | 1.82804 | 1.29915 |
| 8 | 1.99256 | 1.34864 |
| 9 | 2.17189 | 1.40002 |
| 10 | 2.36736 | 1.45336 |
| 11 | 2.58043 | 1.50872 |
| 12 | 2.81266 | 1.56620 |
| 13 | 3.06580 | 1.62586 |
| 14 | 3.34173 | 1.68780 |
| 15 | 3.64248 | 1.75210 |

| | Simple 90% Floor Guarantee | | | | 90% Floor Guarantee w/ Reduced Future Payments | | | |
|---|---|---|---|---|---|---|---|---|
| | Normal Variable Payment | Payment with 90% Guarantee | Amount Due From Fut Payments | Cost to Insurance Company | Normal Variable Payment | Payment with 90% Guarantee | Amount Due From Fut Payments | Cost to Insurance Company |
| 1 | $100 | $100 | $0 | $0 | $100 | $100 | $0 | $0 |
| 2 | $115 | $115 | $0 | $0 | $115 | $115 | $0 | $0 |
| 3 | $112 | $112 | $0 | $0 | $112 | $112 | $0 | $0 |
| 4 | $95 | $95 | $0 | $0 | $95 | $95 | $0 | $0 |
| 5 | $83 | $90 | $0 | $7 | $83 | $90 | $7 | $7 |
| 6 | $72 | $90 | $0 | $18 | $72 | $90 | $25 | $18 |
| 7 | $61 | $90 | $0 | $29 | $61 | $90 | $54 | $29 |
| 8 | $75 | $90 | $0 | $15 | $75 | $90 | $69 | $15 |
| 9 | $81 | $90 | $0 | $9 | $81 | $90 | $78 | $9 |
| 10 | $102 | $102 | $0 | $0 | $102 | $90 | $66 | -$12 |
| 11 | $115 | $115 | $0 | $0 | $115 | $90 | $41 | -$25 |
| 12 | $78 | $90 | $0 | $12 | $78 | $90 | $53 | $12 |
| 13 | $99 | $99 | $0 | $0 | $99 | $90 | $44 | -$9 |
| 14 | $108 | $108 | $0 | $0 | $108 | $90 | $26 | -$18 |
| 15 | $125 | $125 | $0 | $0 | $120 | $99 | $5 | -$21 |
| Totals | $1,421 | $1,511 | | $90 | $1,416 | $1,421 | | $5 |

FIGURE 3

Retrospective Method: Floor Payment Equals Initial Payment

| Payment Number | Normal Benefit | Account Value BOY | Annuity Factor | Benefit Payment | Investment Return | Survivorship Adjustment | Account Value EOY |
|---|---|---|---|---|---|---|---|
| 1 | $1,526.69 | $10,000.00 | 6.550 | $1,526.69 | 13.0% | 1.0101 | $9,671.56 |
| 2 | $1,643.01 | $9,671.56 | 5.887 | $1,643.01 | 3.0% | 1.0204 | $8,438.17 |
| 3 | $1,611.71 | $8,438.17 | 5.236 | $1,611.71 | -30.0% | 1.0309 | $4,926.31 |
| 5 | $1,074.47 | $4,926.31 | 4.585 | $1,526.69 | 10.0% | 1.0638 | $3,978.29 |
| 6 | $1,125.64 | $3,978.29 | 4.004 | $1,526.69 | -5.0% | 1.0989 | $2,559.36 |
| 7 | $1,018.44 | $2,559.36 | 3.467 | $1,526.69 | 30.0% | 1.1364 | $1,525.55 |
| 8 | $1,260.92 | $1,525.55 | 2.943 | $1,526.69 | 25.0% | 1.1765 | $0.00 |
| 9 | $1,501.09 | $0.00 | 2.400 | $1,526.69 | 22.0% | 1.2048 | $0.00 |
| 10 | $1,744.13 | $0.00 | 1.771 | $1,526.69 | 15.0% | 1.2346 | $0.00 |
| Total | $12,506.09 | | | $13,941.52 | | | |

FIGURE 4

Prospective Method
Variable Annuity with Guaranteed Minimum Payments

| Annuity Units | Annuity Unit Value | Annuity Reserve | Units per Payment | Benefit Payment | Shortfall Amount | Shortfall (in units) | Adjusted Reserve | Reduced Units |
|---|---|---|---|---|---|---|---|---|
| 10,112.25 | $1.00 | $10,112.25 | 1,500.00 | $1,500.00 | $0.00 | 0.00 | $10,112.25 | 1,500.00 |
| 9,134.20 | $1.10 | $10,047.62 | 1,500.00 | $1,650.00 | $0.00 | 0.00 | $10,047.62 | 1,500.00 |
| 8,179.50 | $0.87 | $7,116.17 | 1,500.00 | $1,500.00 | $195.00 | 224.14 | $6,921.17 | 1,449.67 |
| 6,987.77 | $0.97 | $6,778.13 | 1,449.67 | $1,500.00 | $93.82 | 96.73 | $6,684.31 | 1,424.35 |
| 6,078.13 | $1.05 | $6,382.04 | 1,424.35 | $1,500.00 | $4.44 | 4.22 | $6,377.60 | 1,423.05 |
| 5,364.88 | $1.07 | $5,740.42 | 1,423.05 | $1,522.67 | $0.00 | 0.00 | $5,740.42 | 1,423.05 |
| 4,703.31 | $1.05 | $4,938.48 | 1,423.05 | $1,500.00 | $5.79 | 5.52 | $4,932.68 | 1,420.66 |
| 4,045.27 | $1.00 | $4,045.27 | 1,420.66 | $1,500.00 | $79.34 | 79.34 | $3,965.93 | 1,377.71 |
| 3,219.92 | $1.04 | $3,348.71 | 1,377.71 | $1,500.00 | $67.18 | 64.59 | $3,281.53 | 1,329.41 |
| 2,304.31 | $1.04 | $2,396.48 | 1,329.41 | $1,500.00 | $117.42 | 112.90 | $2,279.06 | 1,175.45 |

FIGURE 5

| Withdrawal Number | Account Value BOY | Withdrawal Amount | Investment Return | Account Value EOY |
|---|---|---|---|---|
| 1 | $100,000.00 | $7,500.00 | 12% | $103,600.00 |
| 2 | $103,600.00 | $7,770.00 | 16% | $111,162.80 |
| 3 | $111,162.80 | $8,337.21 | 12% | $115,164.66 |
| 4 | $115,164.66 | $8,637.35 | -5% | $101,200.95 |
| 5 | $101,200.95 | $8,637.35 | -10% | $83,307.24 |
| 6 | $83,307.24 | $8,637.35 | -21% | $58,989.21 |
| 7 | $58,989.21 | $8,637.35 | 5% | $52,869.45 |
| 8 | $52,869.45 | $8,637.35 | -14% | $38,039.61 |
| 9 | $38,039.61 | $8,637.35 | 1% | $29,696.28 |
| 10 | $29,696.28 | $8,637.35 | -15% | $17,900.09 |
| 11 | $17,900.09 | $8,637.35 | -5% | $8,799.61 |
| 12 | $8,799.61 | $8,637.35 | 15% | $186.60 |
| 13 | $186.60 | $8,637.35 | 23% | $0.00 |
| 14 | $0.00 | $8,637.35 | 10% | $0.00 |
| 15 | $0.00 | $8,637.35 | 8% | $0.00 |

FIGURE 6

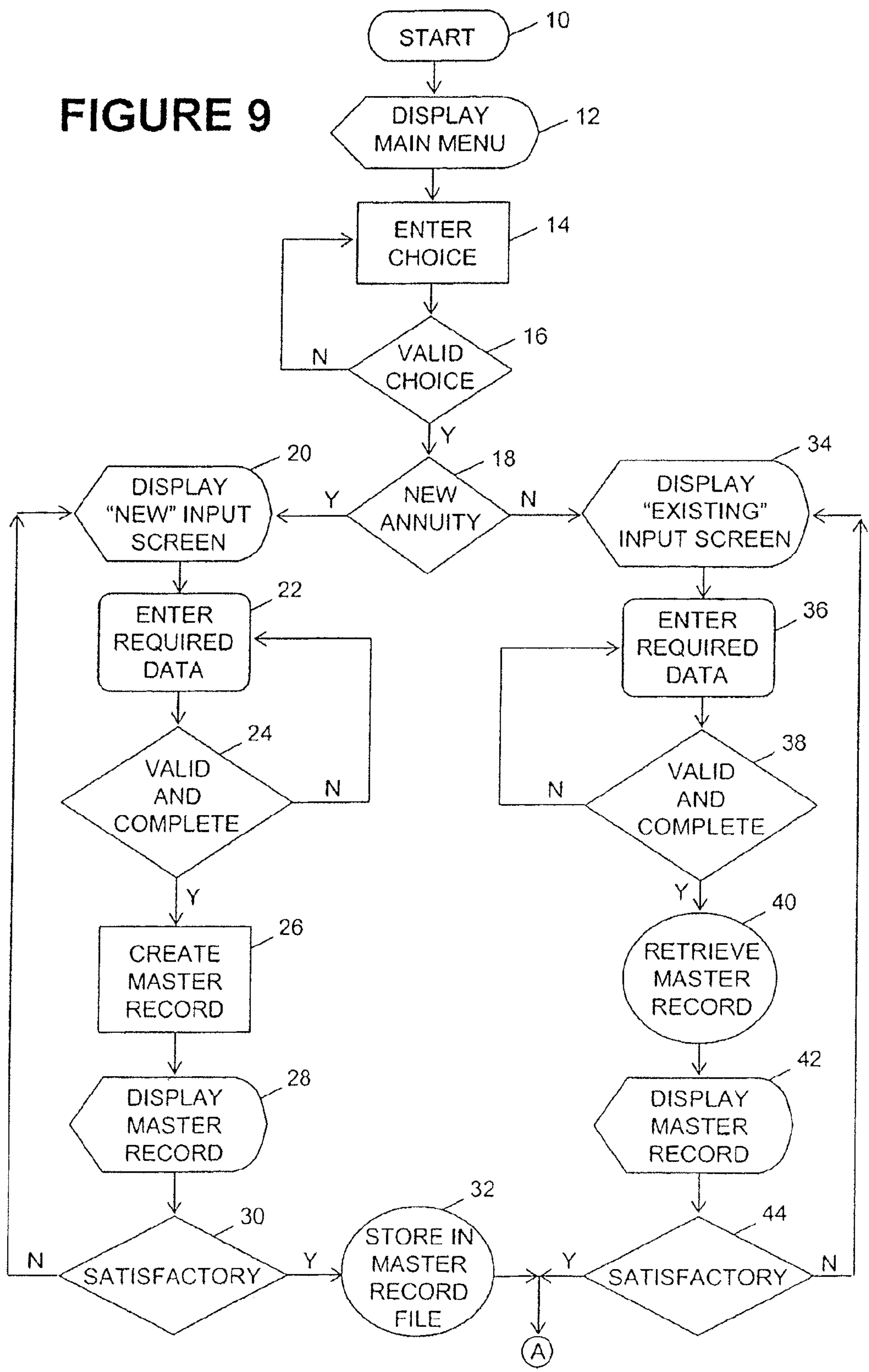
FIGURE 9
START
10
DISPLAY MAIN MENU
12
ENTER CHOICE
14
VALID CHOICE
16
N
Y
NEW ANNUITY
18
Y
N
DISPLAY "NEW" INPUT SCREEN
20
DISPLAY "EXISTING" INPUT SCREEN
34
ENTER REQUIRED DATA
22
VALID AND COMPLETE
24
N
Y
CREATE MASTER RECORD
26
DISPLAY MASTER RECORD
28
SATISFACTORY
30
N
Y
STORE IN MASTER RECORD FILE
32
ENTER REQUIRED DATA
36
VALID AND COMPLETE
38
N
Y
RETRIEVE MASTER RECORD
40
DISPLAY MASTER RECORD
42
SATISFACTORY
44
Y
N
A

D

152
ACCOUNT VALUE = $0
N
ACCOUNT VALUE ≥ WITHDRAWAL
148
Y
150
REDUCE ACCOUNT VALUE BY WITHDRAWAL
154
UPDATE MASTER RECORD
E
156
GENERATE REPORTS
ACCT'G FILE
VALUATION FILE
PAYMENT CENTER FILE
CUSTOMER SERVICE FILE
OTHER FILES
PROCESS RECORDS & ACCT'G
ESTABLISH RESERVES
PREPARE & MAIL CHECK + REPORT
PREPARE SCREENS FOR CUSTOMER SERVICE
OTHER ACTIVITIES

METHOD AND APPARATUS FOR PROVIDING RETIREMENT INCOME BENEFITS

RELATED APPLICATIONS

This application is a continuation application of U.S. patent application Ser. No. 11/520,411 filed on Sep. 13, 2006, which is a divisional application of U.S. patent application Ser. No. 09/804,667 filed Mar. 12, 2001, now issued U.S. Pat. No. 7,376,608 which is a Continuation-in-Part of U.S. patent application Ser. No. 09/406,290 filed on Sep. 24, 1999, now issued U.S. Pat. No. 7,089,201, (which is the subject of a Certificate of Re-examination to issue on Dec. 7, 2010) which claims priority to U.S. Provisional Applications: Ser. No. 60/101,883 filed on Sep. 25, 1998; and Ser. No. 60/115,570, filed on Jan. 12, 1999, the complete disclosures of which are hereby expressly incorporated herein by this reference thereto.

FIELD OF THE INVENTION

The present invention relates to financial services and products. More particularly, the present invention relates to a method and system for administering retirement income benefits. The invention further relates to a data processing method and system for the efficient administration of variable annuity products, including provisions for guarantees related to retirement income derived from and death benefits associated with variable annuities, in both the accumulation and distribution (or payout) phases. The invention also relates to data processing and administrative systems used to administer withdrawals from mutual funds, particularly systematic withdrawals from such funds.

BACKGROUND OF THE INVENTION

Annuities typically serve the useful function of providing economic protection against the risk of longevity, in that an annuitant has the option of electing a life-contingent retirement income, thereby transferring the risk of outliving one's accumulated assets to an insurer.

A number of different kinds of annuities are available to meet the diverse needs of different individuals. These include deferred annuities and immediate annuities. In a deferred annuity, an individual is typically still in the "accumulation phase" of the annuity, amassing assets intended to sustain him or her during retirement years, when an earned wage from performing work is absent. In an immediate annuity, a lump sum of money is applied to purchase a series of retirement income benefit payments, with the first payment typically being made about one month after purchase, with subsequent benefit payments arriving each month thereafter.

The length of the term of the retirement income benefit payments is determined by the annuity benefit option elected by the annuitant. One type of annuity benefit option can provide lifetime income for the annuitant, regardless of how long he or she survives. Another type provides a similar benefit, but covers two lives, typically the annuitant and spouse.

Various types of additional guarantees can be attached to these life-contingent annuity benefit options. These include an option that guarantees the insurer will make at least a minimum number of monthly payments, typically 120 or 240. Another type of option guarantees that the insurer will pay out in benefits at least as much value as was applied to purchase the annuity. Increasing the guarantees typically has the effect of reducing the amount of the annuity benefit payments.

Non-life-contingent annuity benefit options are also available. For example, an annuity benefit that makes monthly payments for a specified period of time, such as thirty years, and then terminates is available.

Another distinction of the type of annuities available is whether it is classified as a "fixed annuity" or a "variable annuity." In a fixed annuity, the insurer bears the investment risks. The insurer guarantees a rate of interest applicable to each annuity deposit. The guarantee applies for a specified period of time, often one year, and is then reset periodically, moving in an amount and a direction that correlates with fixed-income investment yields available to the insurer in the capital markets.

In a variable annuity, the annuity contract owner bears the investment risk during the accumulation phase of the annuity. The annuitant(s) bear(s) the investment risk during the distribution, or payout, phase of the variable annuity. The individual(s) (owner and/or annuitant, who can be the same person) controlling the variable annuity typically have a choice of funds in which they can direct that annuity deposits be invested. These funds typically each represent one asset class, such as large capitalization U.S. common stocks, corporate bonds, money market instruments, or international stocks.

In a fixed annuity, the account value during the accumulation phase can only increase with time. In a variable annuity, the account value during the accumulation phase can either increase or decrease with time, depending on the performance of the fund(s) in which the annuity contract owner has directed that deposits be invested. The hope and expectation, but not guarantee, is that investments in the riskier asset classes typically associated with a variable annuity will provide long-term accumulated values superior to those of a fixed annuity. As annuities are geared toward providing retirement income, there typically is a long-tei in holding period. The table and graph of FIG. 1 illustrate annuity contract values as a function of time for both variable and fixed annuities. The fixed annuity contract of FIG. 1 illustratively earns 5% annually.

In a fixed annuity, the dollar amount of each annuity benefit payment during the distribution phase is known with certainty at the time the account value is applied to the purchase of an annuity benefit option. The point in time where the accumulated value of the deferred annuity is exchanged for a promise by the insurer of a series of future retirement income benefit payments is termed "annuitization." Fixed annuity benefit payments are typically level forever, such as $1,000 per month, or increase by a specified percentage, such as $1,000 per month, increasing by 3% each year. However, fixed annuity benefit payments are definitely determinable as to dollar amount at the point where the annuity contract owner elects the annuity benefit option from among his or her choices.

In a variable annuity, the dollar amount of each annuity benefit payment during the distribution phase is not known with certainty at the time the account value is applied to the purchase of an annuity benefit option. Rather, the annuitant(s) typically receive(s) the value of a specified number of annuity units each month. For example, if the annuitant is entitled to the value of 500 annuity units per month and the annuity unit value on the valuation date that determines the annuitant's benefit is $2.00, the annuitant receives an annuity benefit payment of $1,000 that month. If, on the next succeeding valuation date that determines the annuitant's benefit payment the annuity unit value is $2.05, the annuitant receives an annuity benefit payment of $1,025 that month. If the annuity unit value on the subsequent valuation date is $1.95, the annuitant receives $975 that month.

In contrast to fixed annuity benefit payments, variable annuity benefit payments are definitely determinable at the time of the annuity option election as to the number of annuity units that will determine the amount of the benefit payment on each future payment date. The variable annuity benefit payments are not definitely determinable as to dollar amount at the point where the annuity contract owner elects the annuity benefit option from among his or her choices.

For variable annuities, “accumulation units” are the measure of value during the accumulation phase. Each specific fund or “subaccount”, such as a domestic common stock fund, has an accumulation unit value that increases daily by realized and unrealized capital appreciation, dividends, and interest, and that decreases each day by realized and unrealized capital losses, taxes, and fees. The worth of a variable annuity contract owner’s account is the number of accumulation units owned in each fund multiplied by the accumulation unit value of each fund as of the most recent valuation date (typically daily).

For variable annuities, “annuity units” are the measure of value during the distribution phase. “Annuity units” work very much like accumulation units, with one exception.

Annuity units have built into them an “assumed interest rate (AIR)”—such as 3%, 4%, or 5%—at which a fund is assumed to grow annually in value. Thus, if a fund with a 5% AIR actually grew at 5% during a year, the annuity unit value for that fund would remain unchanged. To the extent the fund performance exceeds 5% AIR, annuity unit value increases. To the extent fund performance falls short of 5% AIR, annuity unit value decreases. Since the monthly benefit payment to the annuitant is the number of annuity units payable times the annuity unit value, fund performance in excess of the AIR causes the monthly annuity benefit payments to increase. Fund performance less than the AIR causes the monthly annuity benefit payments to decrease.

The table and graph of FIG. 2 illustrate the growth of accumulation unit value and annuity unit value, assuming a 9% gross investment return and a 5% AIR in the annuity unit value, for 15 contract years.

Variable annuity benefit options of sufficiently long duration have historically provided an inflation hedge to retirees superior to that available under fixed annuities.

Annuitants may be apprehensive about electing a variable annuity benefit option, even when it may be in their best long-term interest, due to the fact that the dollar amount of such benefit payments could theoretically decrease to zero. Because of this uncertainty relating to benefits under a variable annuity, there is clearly value with regard to the insurer providing a minimum benefit. To date, these programs simply have the insurer making up any differences between the actual minimum benefit payment and the benefit payment the annuitant would have received in the absence of such a program. There is no impact on future benefits. Such a guarantee is inherently expensive. What is described below are new features for variable annuity products. What is also described are automated methods and systems for implementing and administering such products in a more efficient—that is, less expensive way. This cost reduction efficiency may come, for example, by way of reducing future benefits whenever the insurer makes up a shortfall, as well as by other means described below.

While annuitization guarantees lifetime income, the contract holder loses liquidity (and, depending on the type of annuity, some or all of the death benefit implied by full liquidity). During the accumulation phase, the contract holder has full access to the account value. After annuitization, the contract holder cannot withdraw account value in excess of that provided in monthly payments, and the death benefit available is either zero or limited in some way (e.g. paid only as a continuation of payments throughout the certain period). Because of this loss of liquidity and reduced (or non-existent) death benefit, many contract holders wanting periodic income choose not to annuitize. Instead, they make systematic withdrawals from their annuity while maintaining it in its active, or accumulation, phase.

Systematic withdrawal programs from active, unannuitized deferred annuity contracts are an alternative mechanism (i.e., an alternative to annuitization) for distributing retirement income to contract holders. While these programs provide full liquidity, that liquidity requires some tradeoffs. For example, if withdrawals are set at a specified dollar level, then these distributions can fully deplete the account value. In other words, the contract holder can outlive the retirement income provided by this method of systematic withdrawal. Alternatively, if withdrawals are set as a percent of account value, then the period of distribution may be extended indefinitely, but a meaningful level of monthly retirement income may not be achieved. For example, if the percentage chosen is too high, the bulk of the account value will be distributed in the early years, leaving a much smaller account value base against which the same percentage will be applied, resulting in inconsequential monthly retirement income payments. Systematic withdrawal programs may also be applied to mutual funds, which aside from differences in taxation and asset charges, are very similar to the accumulation phase of variable annuities.

BRIEF SUMMARY OF THE INVENTION

One aspect of the present invention provides an annuity based retirement program which utilizes a variable annuity product with a guaranteed minimum payment. Unlike existing products, however, the product of the present invention is administered by a process in which deficits (i.e., differences between the minimum payments and what would otherwise be the actual payments when actual payments fall below the minimums) are repaid from future payments. The chart of FIG. 3 illustrates this aspect of the invention. FIG. 3 illustrates variable annuity payouts with a simple floor guarantee and a program administered by a method that funds current deficiencies (without interest) from future payments. Another aspect of the invention is the provision of alternative techniques (including a retrospective method and a prospective method) of implementing such a program.

Another aspect of the present invention relates to distributions associated with withdrawal programs, including systematic withdrawal programs. More specifically, this aspect of the invention provides a method for administering a systematic withdrawal program in which the distribution program calls for a percentage withdrawal, the dollar amount of which is allowed to vary as the account value varies due to withdrawals, fees and expenses, and appreciation.

Another aspect of the present invention provides a combination of benefits superior to both annuitizations and systematic withdrawal programs (whether from deferred annuities or from mutual funds) by joining the two programs seamlessly so as to provide lifetime income annuities (or mutual fund programs) which maintain liquidity for the contract holder for as many years as the contract holder chooses. Upon commencement of the program, the contract holder may elect the number of years during which full liquidity is desired. For example, an owner age 65 may elect to retain contract liquidity for twenty years. Using an assumed interest rate (AIR) and other factors, an initial payment will be determined. The amount of this payment will change from period to period based on the same formula used in determining payment changes under a typical variable immediate annuity, or annuitization under a variable deferred annuity. At the end of twenty years, if the contract holder wants payments to continue on this basis and be guaranteed for life, then liquidity is given up and the account value is no longer available as a death benefit. The exchange of account value liquidity for payments guaranteed for life may be optional at or before the end of the liquidity period. The liquidity period may be changed at any time, or the contract holder may also continue the withdrawal program on some other basis, or may elect to surrender the contract for its account value. For mutual fund programs, the assets remaining in the mutual fund at the end of the liquidity period may, at the owner's option, be transferred to an immediate variable annuity to complete the program.

This aspect of the invention provides a type of systematic withdrawal program (which may be applied to either deferred annuities or to mutual funds) that converts at the end of a stated period (the liquidity period) to an annuity. The annuity chosen is assumed here to be a life annuity, but other forms of annuities might also be made available. Essentially, the value remaining in the account at the end of the liquidity period is used to purchase a life annuity that continues payments for the life of the annuitant. The program blends the withdrawal program with this annuitization in a seamless way. Payments, first as withdrawals and later as annuity payments, are adjusted each period to reflect actual net investment returns, in the same way that variable annuity payments are normally adjusted. Consequently, while payments under the life annuity portion of the program are guaranteed for the life of the annuitant, the amount of each payment is not guaranteed. This invention involves a unique administrative system that, among other things, customizes the liquidity period and the level of withdrawal to the particular owner.

This aspect of the present invention differs in several ways from variable annuitizations that allow commutation of future payments, and which therefore provide some degree of "liquidity". First, this program primarily applies to the accumulation period of the deferred annuity and does not require actual annuitization. Second, commutation of future payments requires demonstration of good health. Third, commutation may provide for less surrender value than the present invention provides, due to additional loads or charges applied at the time of commutation. Fourth, during its liquidity period, the present invention utilizes a "retrospective" approach in determining contract value while commutation programs utilize a prospective approach.

Since initial and subsequent payments are higher with shorter liquidity periods, contract holders may decide for themselves the appropriate length of the liquidity period. Some may elect very short periods, such as five years. Others may elect very long periods, in effect maintaining complete access to their account values for the entirety of their lives. Even in the latter instance, contract holders enjoy advantages over conventional systematic withdrawal programs. In particular, the initial payment anticipates returning some portion of principal over the contract holder's expected lifetime (the remaining portion being returned at death), while still guaranteeing that payments will be made regardless of how long the contract holder lives. Changes in payments from period to period are governed by the same formula as is used for life annuities and resulting payments are guaranteed for life.

Certain embodiments of the present invention provide a data processing method and apparatus for the determination and administration of annuity payments that derive from the seamless combination of systematic withdrawals (from deferred annuities and/or mutual funds) and annuitization as indicated above and as will be described more fully below.

The invention described is intended primarily to apply to variable annuities and mutual funds. Nonetheless, the invention can also be applied to fixed annuities.

Other goals, advantages and novel features of the present invention will become apparent from the following detailed description of the invention when considered in conjunction with the accompanying drawings.

BRIEF DESCRIPTION OF THE DRAWINGS

FIG. 3 shows a chart illustrating variable annuity payouts with a simple floor guarantee and a program that repays current deficiencies from future payments in accordance with one aspect of the invention.

FIG. 4 shows a table comparing a normal variable annuity benefit under an annuity contract to the benefit payable under a contract which incorporates a retrospective method of benefit determination, in accordance with one aspect of the present invention.

FIG. 5 shows a table illustrating a reduction in units per payment under a program that guarantees a minimum payment and accounts for any shortfall by reducing the number of units used to calculate future benefit payments, in accordance with one aspect of the present invention.

FIG. 6 shows a table illustrating the operation of a systematic withdrawal program, in accordance with one aspect of the present invention.

FIG. 9 shows a flow chart illustrating the data collection and entry steps of the computerized method of the present invention.

DETAILED DESCRIPTION OF THE INVENTION

Figure 1:
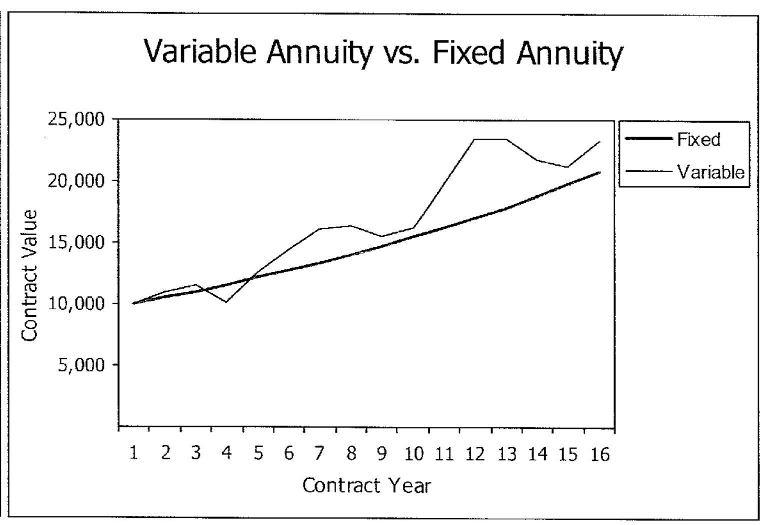
FIG. 1 shows a table and graph illustrating annuity contract values as a function of time for both variable and fixed annuities.
Figure 2:
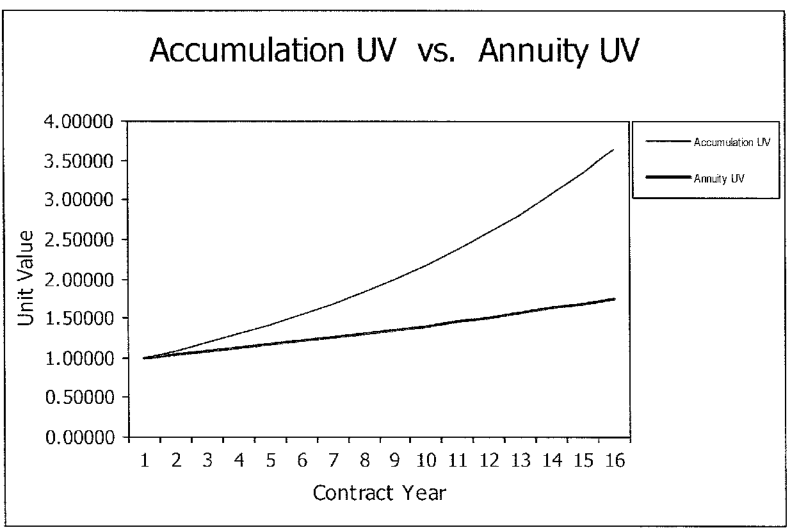
FIG. 2 shows a table and graph illustrating the growth of accumulation unit values and annuity unit values over a 15 year term.

The initial variable annuity benefit is determined under the terms of the variable annuity contract. Such terms state the factors for converting each $1,000 of accumulated value into an initial amount of variable annuity income benefit. Variable annuity benefit payments subsequent to the initial payment are typically defined as follows:

$$\text{Benefit}_{t+1} = \text{Benefit}_t \times \frac{1+i}{1+AIR}$$

where: $\text{Benefit}_{t+1}$=dollar amount of variable annuity benefit at time t+1

$\text{Benefit}_t$=dollar amount of variable annuity benefit at time t i=actual fund performance during period t to t+1 (as a %)

AIR=assumed investment rate

For simplicity, this formula assumes annual variable annuity benefit payments. For monthly payment frequency, the entire fraction appearing in the above formula is raised to the n/365 power, where n is the number of days in the valuation period (typically $28 \leqq n \leqq 31$) and the year involved is a non-leap year.

As an example, if the benefit payment at time t is $1,000, the AIR is 5%, and actual fund performance is 10%, the subsequent variable annuity benefit payment is determined as follows:

$$\begin{aligned}\text{Benefit}_{t+1} &= \text{Benefit}_t \times \frac{1+i}{1+AIR} \\ &= \$1{,}000 \times \frac{1+.10}{1+.05} \\ &= \$1{,}047.62\end{aligned}$$

An illustrative example of an annuity based program in which deficits are funded from future benefits using a retrospective formula follows. This is merely one example of an approach the administration of which is covered under this invention to handle guaranteed minimum variable income benefits in other than the conventional manner.

Under this retrospective approach, the insurer establishes or calculates a minimum benefit amount. The insurer tracks an "account value" (although the concept of an "account value" after the point of annuitization has heretofore been eliminated, since annuity contract owners are told at the point of annuitization that they have irrevocably exchanged their account value for a series of future annuity benefit payments and, therefore, should no longer embrace the concept of an "account value" for which the contract may be surrendered). The "account value" would be increased by appreciation and survivorship and decreased by annuity benefit payments.

$$\begin{aligned}\text{Account Value}_{t+1} &= (\text{Account Value}_t - \text{Benefit}_t) \times (1+i) \times (1/p_y) \\ &= (\text{Account Value}_t - \text{Benefit}_t) \times (1+i) + (1-p_y)/p_y \times (\text{Account Value}_t - \text{Benefit}_t) \times (1+i) \\ &= \text{Normal Account Value Progression} + \text{increment for survivorship}\end{aligned}$$

where:

$\text{Account Value}_{t+1}$ = Account Value at time $t+1$ $\text{Account Value}_t$ = Account Value at time $t$ $\text{Benefit}_t$ = dollar amount of variable annuity benefit at time $t$ = maximum {Preliminary benefit, Guaranteed minimum benefit}, where:

$$\text{Preliminary Benefit}_t = \frac{\text{Account Value}_t}{\text{Attained age annuity factor}}$$

$i$ = actual fund performance during period $t$ to $t+1$ (as a %)

$p_y$ = probability annuitant age $y$ survives to age $y+1$

The "Normal Account Value Progression" is for an active (unannuitized) deferred annuity contract from which withdrawals, including those under a form of systematic withdrawal program, are being made.

Under this retrospective approach, the determination of the benefit payment for each period differs from the typical approach previously described. The insurer guarantees that if the account value determined by the progression of values in the series shown above goes to zero, the insurer will commence making payments to the annuitant from its own funds.

The table of FIG. 4 compares the normal variable benefit typically payable under an annuity contract to the benefit payable under a contract which incorporates the retrospective method of this example where the guaranteed minimum payment is equal to the initial payment. The total payments under the retrospective method exceed those under the normal benefit. The insurer pays all amounts after the account value is exhausted.

Another illustrative example follows, using a prospective formula. Again, this is merely one example of an approach the administration of which is covered under this invention to handle variable income benefits in other than the conventional manner described earlier. In this approach, a guaranteed minimum variable income benefit is established below which the benefit payment will not fall. However, in the event the benefit payment calculated without regard to the minimum falls below the minimum benefit payment guaranteed, a portion of the variable annuity benefit reserve held by the insurer will be liquidated in an amount sufficient to cover the shortfall. This will result in reduced benefits in the long term when performance of the funds might otherwise dictate a larger benefit payment.

As mentioned, the series of variable annuity benefit payments traditionally has a lower bound of zero. There are a variety of ways in which a positive, non-zero lower bound can be introduced. It will be assumed here that the lower bound will be a function of the initial variable annuity benefit payment. In this example, the initial variable annuity benefit payment is $1,000 and all future variable annuity benefit payments will be assumed to be no less than 100% of the initial benefit.

In this example, whenever fund performance would cause a variable annuity benefit payment to be less than $1,000, a portion of the variable annuity benefit reserve held by the insurer will be liquidated in the exact amount to cover the shortfall.

Under this approach to a guaranteed floor under variable annuity benefit payments, the following formula would govern the series of annuity benefit payments:

$$\text{Benefit}_{t+1} = \text{Benefit}_t \times \frac{1+i}{1+AIR} \times (1 - S/R)$$

where: $\text{Benefit}_{t+1}$=dollar amount of variable annuity benefit at time t+1

$\text{Benefit}_t$=dollar amount of variable annuity benefit at time t i=actual fund performance during period t to t+1 (as a %)

AIR=assumed investment rate

S=shortfall (below floor)

R=reserve prior to adjustment for shortfall

When a shortfall occurs, one method to implement the above approach is to reduce the number of annuity units payable on future benefit dates. The new, lower number of annuity units payable on future payment dates is that which can be funded by the new, lower reserve, That is, the new number of annuity units equals the reserve reduced by the shortfall, divided by an attained age annuity factor, and further divided by the annuity unit value.

This calculation will recognize the nature of the prospective payments. For example, if the original annuity benefit were a single life annuity with ten annual payments guaranteed regardless of the survival or non-survival of the annuitant, the first benefit payment occurring at the point of annuitization, and the second annual benefit payment falling below the $1,000 guaranteed level, the number of annuity units payable on future payment dates would be that number able to be funded by the reserve (adjusted by the shortfall) as applied to a single life annuity with eight annual payments guaranteed. The calculation would use the annuitant's then-attained age and, in jurisdictions and/or markets where appropriate, the annuitant's gender.

Alternative, but similar, methods and systems to support them may be used to facilitate the same objective of providing a guaranteed floor of periodic annuity income. For example, annuity payments immediately subsequent to the one(s) creating a shortfall could be reduced—but not below the guaranteed floor level of payment—until the cumulative shortfall had been made up. The present invention provides the computer-automated process to handle these variants.

The table of FIG. 5 shows the reduction in units per payment under a program that guarantees a minimum payment of $1,500 and accounts for any shortfall by reducing the number of units used to calculate future benefit payments.

Other variations of the system and method of the present invention include, but are not limited to, the following:

Non-level variable benefit floors—For example, a floor which starts at $1,000 and increases by a fixed dollar amount (e.g. $40) per year or by a fixed percentage (e.g. 4%) per year Benefit floors in conjunction with benefit ceilings ("collars")—For example, benefit shortfalls that occur when an annuity benefit would be below the floor level due to fund performance serve to reduce all future annuity benefit payments under the adjustment mechanism described above. With a benefit ceiling, any annuity benefit payments above the ceiling (a) would result in a benefit payment being made only at the ceiling level and (b) would serve to increase all future annuity benefit payments, such as by increasing the number of annuity units payable on all future payment dates. The formula governing this ceiling structure is identical to that shown above for the floor structure. The only difference is that the excess benefit payment above the ceiling is to be thought of as a negative shortfall. Equivalently stated:

$$\text{Benefit}_{t+1} = \text{Benefit}_t \times \frac{1+i}{1+AIR} \times (1 + X/R)$$

where:

$\text{Benefit}_{t+1}$=dollar amount of variable annuity benefit at time t+1

$\text{Benefit}_t$=dollar amount of variable annuity benefit at time t i=actual fund performance during period t to t+1 (as a %)

AIR=assumed investment rate

X=excess (above ceiling)

R=reserve prior to adjustment for excess

Additional annuity units payable on future dates as a result of fund performance causing the ceiling to be penetrated can partially restore, wholly restore, or more than restore any annuity unit decreases that resulted from previous shortfalls due to fund performance causing the floor to be penetrated.

Non-level variable benefit ceilings. For example, a ceiling which starts at $1,200 and increases by a fixed dollar amount (e.g. $40) per year or by a fixed percentage (e.g. 4%) per year.

Non-level variable benefit floors in conjunction with non-level variable benefit ceilings. This allows for a variety of shapes of corridors, whereby the slope of the floor and the slope of the ceiling can run in parallel or non-parallel fashions over time. (Consider time to be the x-axis variable and dollar amount of the floor or ceiling to be the y-axis variable.)

In addition to distribution methods associated with true annuitizations, distributions associated withdrawal programs—including systematic withdrawal programs—from active (unannuitized) deferred annuity contracts are also encompassed by this invention.

For example, for a given attained age(s) and, where allowed, gender(s), an insurer may permit withdrawals from an active (unannuitized) deferred annuity contract. Under such a program, if these withdrawals do not exceed a predetermined percentage established by the insurer for a given withdrawal frequency, the insurer guarantees that withdrawals under this program will last for the period prescribed, including a lifetime period.

As a hypothetical example, if a male age 60 withdraws 4.4% of the initial account value each year, such withdrawals are guaranteed to last a lifetime. (Initial account value is that account value at the time a systematic withdrawal program, inclusive of this guaranteed minimum benefit payment option, commences.) There is an explicit increment to the asset charge for those customers who opt to purchase this benefit.

This distribution program contrasts with those shown earlier in two major ways. First, the variable annuity contract is never "annuitized." Rather, a series of partial withdrawals is made from an active (unannuitized) deferred variable annuity contract. This means that, upon death of the contract owner, the account value is paid to the beneficiary. This contrasts with distribution methods associated with true annuitizations, where the form of the annuity payout option chosen determines whether any residual value remains for a secondary annuitant or beneficiary. For example, under a variable annuity contract annuitized under a single life annuity option with no certain period or other refund option, the insurer's obligation to the annuitant ceases upon death. No further payments, "account value," or any other form of residual value flows to the beneficiary.

Second, because the variable annuity contract is never annuitized under this distribution program, a lump sum or partial account value withdrawal capability still resides with the variable deferred annuity contract owner(s). However, withdrawals in excess of the amounts stated by the insurer to keep the guaranteed payout program in place may alter or may terminate the program.

One variant of this distribution program calls for the percentage withdrawal allowed to be not just of the initial account value, but rather of the highest account value achieved on any policy anniversary following inception of the program, such account value necessarily recognizing all withdrawals and fees as well as appreciation.

For example, suppose a male age 60 may withdraw 4.4% of the initial account value each year under this program and be guaranteed a lifetime income of that amount. Suppose the initial account value at inception of this program is $100,000. The contract owner withdraws $4,400, the maximum permitted. Favorable fund performance causes the account value to increase from $100,000-$4,400=$95,600 to $110,000 as of the contract owner's next policy anniversary when he has attained age 61. The account value against which the 4.4% withdrawal applies is then re-established as the "high-water mark" account value on any policy anniversary. Thus, he may now withdraw up to 4.4% of $110,000, or $4,840, each year and have the lifetime income guarantee program remain in place. If the account value subsequently decreases at all—even to zero—the $4,840 is guaranteed to be paid for life.

The table of FIG. 6 illustrates the operation of this aspect of the invention. In the illustration of FIG. 6, the initial account value is $100,000, the withdrawal guarantee is 7.5% of the highest account value attained, the investment return is assumed to be as illustrated, and the term is 15 years.

In addition to guaranteed income for specified periods including lifetime periods under systematic withdrawal programs, this invention also encompasses the integration of such income guarantees with death benefit guarantees. For example, such death benefit guarantees may promise that the contract owner will have returned to him or her a specified percentage (e.g., 0%-100%, inclusive) of either the initial account value or the "high-water mark" account value as of any subsequent policy anniversary.

Under this approach, the initial withdrawal amount is adjusted in the same way variable annuity benefit payments subsequent to the initial payment are adjusted (see above), substituting "withdrawal" for "benefit" in the formulas. Such adjustment occurs during the liquidity period (chosen by the contract holder at the beginning of the program) and continues on into the life annuity period to adjust the variable payments under that phase of the program also.

Since the first adjustments are made during the liquidity period, the deferred annuity account value (or mutual fund account value) must be maintained as usual for deferred annuities (or mutual funds), with special adaptation for additional deposits and for withdrawals in excess of the calculated withdrawal amount. Assuming no additional deposits and no excess withdrawals, the administration of the account value proceeds as follows:

$$\text{Account Value}_{t+1} = (\text{Account Value}_t - \text{Withdrawal}_t) \times (1+i)$$

where:

$$\text{Account Value}_{t+1} = \text{Account value at time } t+1$$

$$\text{Account Value}_t = \text{Account value at time } t$$

$$\text{Withdrawal}_t = \text{dollar amount of variable withdrawal benefit at time } t = \text{Withdrawal}_{t+1} \times \frac{1+i}{1+AIR}$$

$$\text{where } AIR = \text{assumed investment rate}$$

$$i = \text{actual fund performance during period } t \text{ to } t+1 \text{ (as a \%)}$$

This withdrawal program contrasts with normal annuitization in two ways. First, the annuitization of the contract (or, in the case of a mutual fund, purchase of the annuity) is postponed until the end of the liquidity period (which may be the end of the mortality table, if so elected). Rather, a series of partial withdrawals in amounts specified by the program is made from an active (unannuitized) deferred variable annuity contract (or mutual fund). This means that, upon death of the contract owner during the liquidity period, the account value is paid to the beneficiary. This contrasts with distribution methods associated with true annuitizations, where the form of the annuity payout option chosen governs whether any residual value remains for a secondary annuitant or beneficiary. For example, under a variable annuity contract annuitized under a single life annuity option with no certain period or other refund option, the insurer's obligation to the annuitant ceases upon death. No further payments, "account value," or any other form of residual value flows to the beneficiary. Even if the annuitization option includes a period certain (for example, life with a 10-year period certain), and even though the death of the annuitant during the certain period does not prevent the balance of the certain period payments from being made, no "account value" is available as a death benefit and no further benefits are paid after the certain period has ended.

Second, because the annuitization of the variable annuity contract (or mutual fund) is postponed, a lump sum or partial account value withdrawal capability still resides with the owner(s) during the liquidity period. Additionally, the contract holder may elect to withdraw less than the allowable withdrawal amount; payments under a variable annuity payout do not offer this flexibility.

Figure 7:
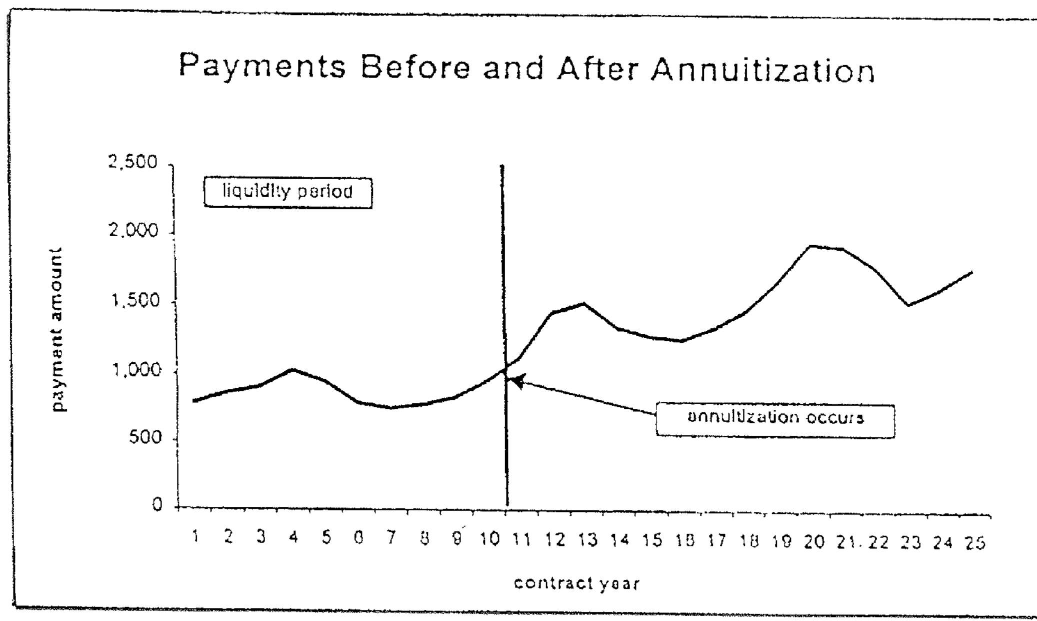
FIG. 7 shows a graph illustrating variable payments made during and after a liquidity period, in accordance with one aspect of the present invention.
Figure 8:
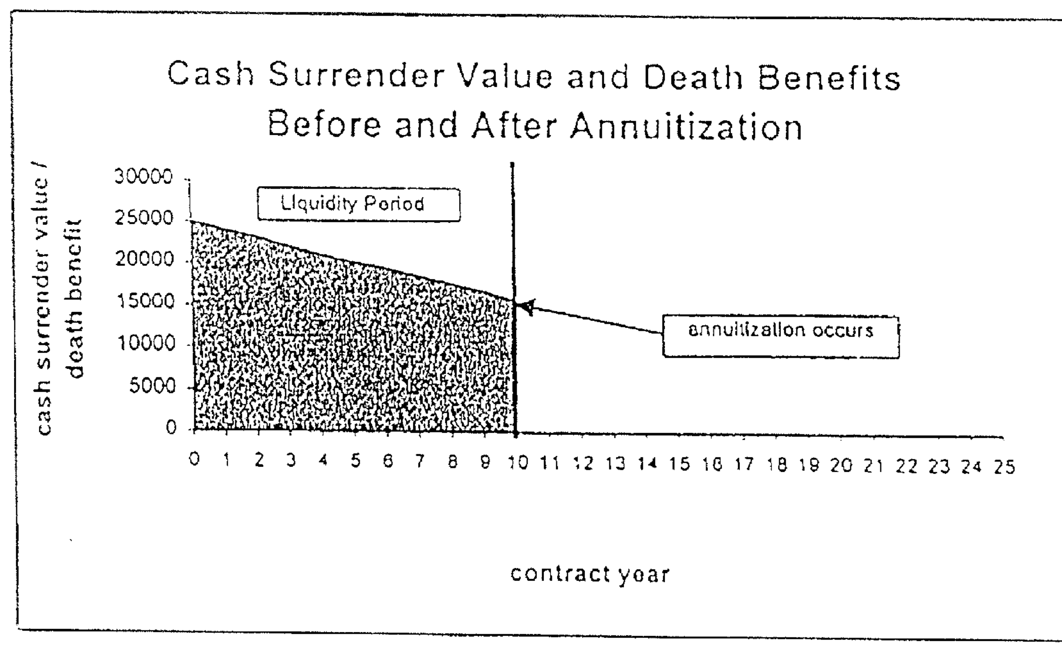
FIG. 8 shows a graph illustrating the cash surrender value and death benefits in affect before and after annuitization for a program of the type illustrated in FIG. 7.

Under this approach (which applies equally well to joint ownership as to single ownership), the contract holder chooses a period during which systematic withdrawals will be taken and during which full account value liquidity is maintained. At the end of this period, the remaining account value is annuitized according to standard annuity payout options. The insurance company determines the amount of the initial systematic withdrawal, based on the length of the period chosen, the age of the contract holder, and other factors. Using the assumed interest rate (AIR), the company calculates the initial withdrawal so that, if the AIR is realized over time, sufficient account value will be present at the end of the systematic withdrawal period to fund the annuitization. FIG. 7 illustrates variable payments made during and after the liquidity period in a program of this type. FIG. 8 illustrates the cash surrender value and death benefits before and after annuitization for a program of this type.

The amount of the initial withdrawal can be determined by at least two methods (shown here on the assumption that annual payments are desired). The first method begins with calculating a special annuity factor equal to the present value (using the AIR) of an annual payment of $1.00 during the chosen liquidity period, plus the present value (again using the AIR) of annual payments of $1.00 after the end of the liquidity period, such payments made according to the desired annuity option. The initial withdrawal is then calculated by dividing the available account value (which would generally be net of surrender charges and net of loans, if any) at the beginning of the program by the special annuity factor described above.

Subsequent withdrawals are adjusted up or down exactly as payments are adjusted under normal variable annuitization.

For example, assuming an n-year liquidity period and a life only annuity at the end of that period, the special annuity factor is calculated as follows:

$$\text{Special annuity factor}=\Sigma v^t+\Sigma v^t{}_{t-n}p_{x+n}$$

where:

$v=1/(1+AIR)$ n=number of years in the liquidity period $\Sigma v^t$=the present value of payments from t=1 to t=n $\Sigma vt_{t-n}P_{x+n}$=the present value of payments from t=n+1 to the end of the mortality table, where each payment depends on the probability that the owner lives from duration n to duration t.

A second method for arriving at the initial withdrawal sets the special annuity value equal to the value of an annuity certain for the chosen liquidity period, divided by (1−d), where d is the decimal equivalent of the percentage a payment under the annuity certain must be reduced to provide enough unused principal (accumulated to the end of the liquidity period at the AIR) to provide for the chosen annuity at the end of the liquidity period.

For example, assuming an n-year liquidity period and a life only annuity at the end of that period, the special annuity factor is calculated as follows:

$$\text{Special annuity factor} = \Sigma v^t/(1-d)$$

where:

$d$ = percentage decrease in annuity certain payment, as a decimal $= a_{x+n}/[\Sigma(1+i)t+a_{x+n}]$ $n$ + number of years in the liquidity period $\Sigma v^t$ = the present value of payments from $t=1$ to $t=n$ $a_{x+n}$ = a life only annuity to the annuitant at the end at the end of the liquidity period $\Sigma(1+i)^t$ = the accumulating of paymentsfrom $t=1$ to $t=n$ at the $AIR$ Under either this method or the preceding method, the liquidity period can be extended to the end of the mortality table (for example, age 115); in such case, if the owner lives until that age, a life annuity is still guaranteed, but by that age the financial risk to the insurer is de minimis.

The contract holder may make additional deposits and may make withdrawals in excess of the designated withdrawal amount, provided the end of the liquidity period has not yet been reached. In such instances, the withdrawal program must be adjusted. Adjustments are made by increasing or decreasing the current withdrawal amount by the same proportion as the amount of the new transaction (deposit or excess withdrawal) bears to the account value just prior to the transaction. For example, if the current account value is $50,000 and the current withdrawal amount is $1,500, an additional deposit of $5,000 increases the account value by 10% and the withdrawal amount is therefore increased by 10%. In the same example, an unscheduled withdrawal of $5,000 (which is therefore an excess withdrawal of $5,000) reduces the account value by 10% and the current withdrawal amount reduces by 10%. In the adjustments, the investment return for the period from the most recent scheduled withdrawal to the date of the new transaction may be reflected in the adjustment.

This invention also encompasses the integration of this program with death benefit guarantees. For example, such death benefit guarantees may promise that the contract owner will have returned to him or her a specified percentage of either the initial deposit, the "high-water mark" account value as of any subsequent policy anniversary, deposits accumulated at a specified interest rate or rates, or other definitions of value.

One variation of the invention, applicable to deferred annuities only, would substitute for the liquidity period a death benefit period; that is, the contract would have a period during which the contract holder would not be allowed to access the account value for amounts in excess of the specified withdrawal amounts, but during which the account value is paid at death. One advantage of this variation may be that the program may qualify for more favorable tax treatment. In particular, the withdrawals made during the death benefit period may be taxed on the same basis as are payments made under traditional annuitization.

Description of the Flow Charts

FIG. 9 is a flow chart which illustrates a portion of a computerized method of practicing the present invention. More particularly, FIG. 9 is an illustrative embodiment of the steps which are taken to collect data which is used in the remainder of the process, as described in more detail below. For a new annuity, the data collected through the individual steps illustrated in FIG. 9 may be entered manually at a computer terminal or equivalent input device, or electronically, or in any other manner which is customary at present or in the future. For an existing annuity, the data will generally be retrieved from an existing contract master record, or other file.

The process may be initiated (block 10) either manually at a work station, or automatically in a batch cycle. In either case, a main menu is displayed (block 12) or provided, offering a number of possible operations. A choice may be entered by an operator or emulator (block 14). The choice may be validated as indicated in FIG. 9 (block 16).

After a valid choice has been selected, the system determines whether the subject annuity is a new annuity or an existing annuity (block 18). For a new annuity, the process proceeds to display a new annuity input screen (block 20). This screen contains entry fields for items such as: information regarding the annuitant, owner and/or beneficiary; information regarding type of annuity chosen, including relevant dates and amounts; information on interest and mortality guarantees to be used in the subsequent calculations; and other related information. This data is entered (block 22) and checked for validity and completeness (block 24). If the data is valid and complete, a master record is created (block 26). The fields of the master record are populated with the data entered in step 22. The new master record is then displayed (block 28) for visual checking by an operator. If the data is deemed to be satisfactory (block 30), the master record is stored in a master record file (block 32). If the data is not satisfactory, the process repeats as indicated in FIG. 9.

Referring again to step 18, if the system determines that an existing annuity is to be dealt with, processing proceeds to display the existing annuity input screen (block 34). This screen contains entry fields for items such as: contract number; annuitant identification; and other items associated with the existing annuity contract. New data is entered (block 36) via the existing annuity input screen, and such new data is checked to determine validity and completeness (block 38). The master record associated with the existing annuity contract is retrieved (block 40) and displayed (block 42) for viewing by an operator. If and when the master record, as updated by the newly inputted data, is satisfactory, processing proceeds as indicated in FIG. 9.

Figure 10:
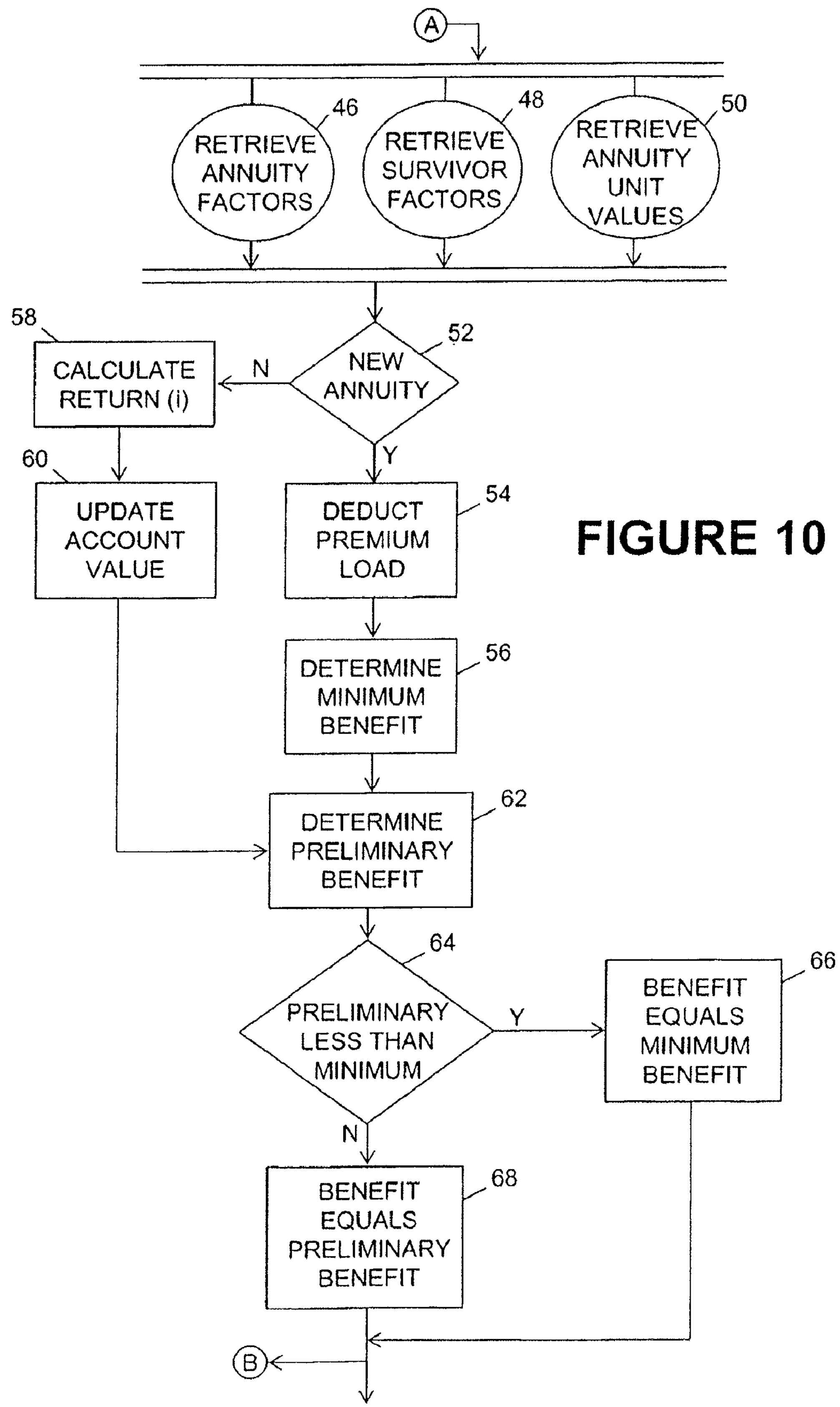
FIG. 10 illustrates a portion of a computerized method which utilizes a retrospective approach to annuity benefit calculation.
Figure 11:
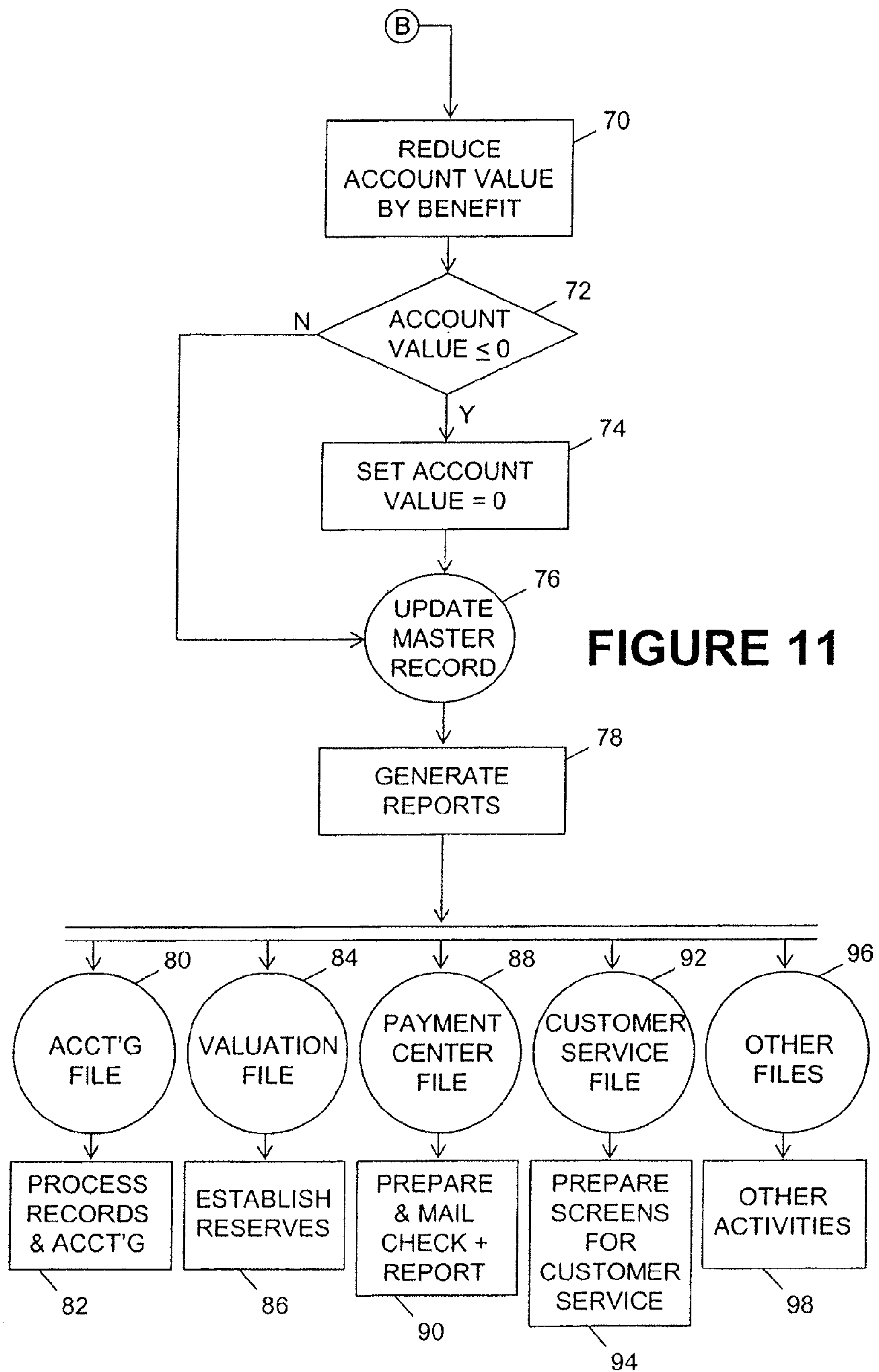
FIG. 11 shows a flow chart which is a continuation of the flow chart of FIG. 10.

FIG. 10 illustrates the next step in the overall process of the present invention. That step is calculation of an annuity benefit using information from the master record, as created or updated in the process of FIG. 9 and other retrieved data. More particularly, the flow charts of FIGS. 10 and 11 illustrate one embodiment of a computer-based process for calculating an annuity benefit in accordance with retrospective approach to benefit calculation.

The first step in the flow chart of FIG. 10 is to retrieve additional data relating to annuity factors (block 46), survivor factors (block 48) and annuity unit factors (block 50). These data are typically stored in files used for other purposes, although duplicate or dedicated purpose files may be created to hold such information for use in the calculation process. The process of FIG. 10 then checks to determine whether the particular calculation at hand involves a new or existing annuity (block 52). If the calculation involves a new annuity, processing proceeds by deducting the premium load (if any) from the amount of money available for purchasing the annuity (block 54). Following this step, the minimum benefit is determined. This calculation uses the net money available for purchasing the annuity, the appropriate annuity factor for the age, sex and type of annuity, and the appropriate annuity unit value to determine the minimum benefit. The minimum benefit may also be adjusted according to other terms of the contract (e.g., multiplied by 0.8, or other factor) (block 56).

For an existing annuity, the system calculates the investment return (i) for the recent period using annuity unit values (block 58). The results of step 58 are then used to update the account value (block 60).

Following step 56, in the case of new annuities, or step 60, in the case of existing annuities, the system proceeds to calculate a preliminary benefit (block 62). The preliminary benefit is calculated according to the terms of the contract, in a manner similar to that used in the calculation of the minimum benefit (step 56). After the first benefit payment, each subsequent preliminary benefit is calculated by dividing the account value by an attained age annuity factor that reflects the terms of the contract.

Following determination of the preliminary benefit, this benefit is compared to the minimum benefit (block 64). If the preliminary benefit is less than the minimum benefit, then the "benefit" is set equal to the minimum benefit (block 66). If the preliminary benefit is greater than the minimum benefit, then the benefit is set equal to the preliminary benefit (block 68).

Processing in accordance with the retrospective approach continues as illustrated by the flow chart of FIG. 11. Generally, the flow chart of FIG. 11 illustrates the steps of using the benefit amount determined in the process of FIG. 10 to update files and make adjustments needed for the benefit calculations to be performed on the next benefit payment date. Also illustrated in FIG. 11 are steps relating to the generation of reports and updates for the benefit of both the annuity payer and the annuitant.

With reference to FIG. 11, the benefit determined in step 66 or 68 is used to reduce the Account Value by the amount of the benefit (block 70). The system then checks to see if the Account Value is less than zero (block 72). If so, the Account Value is then set to equal zero (block 74). In either event, the system then proceeds to update the master record (block 76). All appropriate data and information entered or affected by the processing to this point are captured on the master record. This data would include such items as the amount of the benefit determined in step 66 or 68, the new account value or remaining units, payment date(s) of benefit(s), the next benefit due date, and similar information. Following the updating of the master record (and any other related files), the system generates reports (block 78). Reports may be generated for internal use, as well as for the annuitant. Representative usages are illustrated in FIG. 11. These include: accounting file (block 80) for use in preparing process and accounting records (block 82); a valuation file (block 84) for use in establishing reserves (block 86); a payment center file (block 88) for use in preparing benefit checks and reports to annuitants (block 90); a customer service file (block 92) for use in preparing screens for the use of customer service personnel in responding to inquiries from annuitants and related entities; and other files (block 96) for use in any other activities (block 98) which might be useful to the annuity payer or annuitant.

Figure 12:
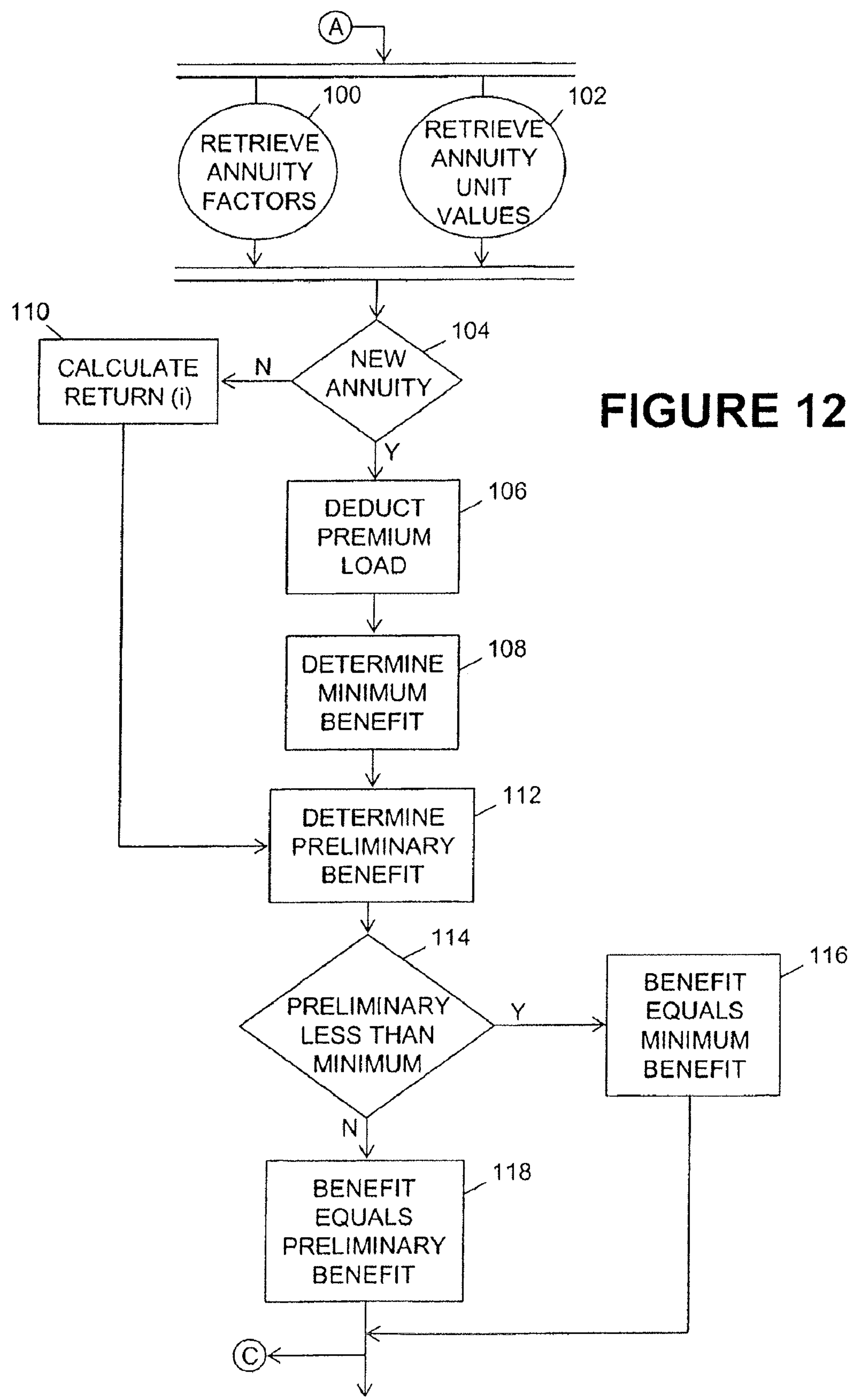
FIG. 12 shows a flow chart which illustrates a portion of a computerized method which utilizes a prospective approach to annuity benefit calculation.
Figure 13:
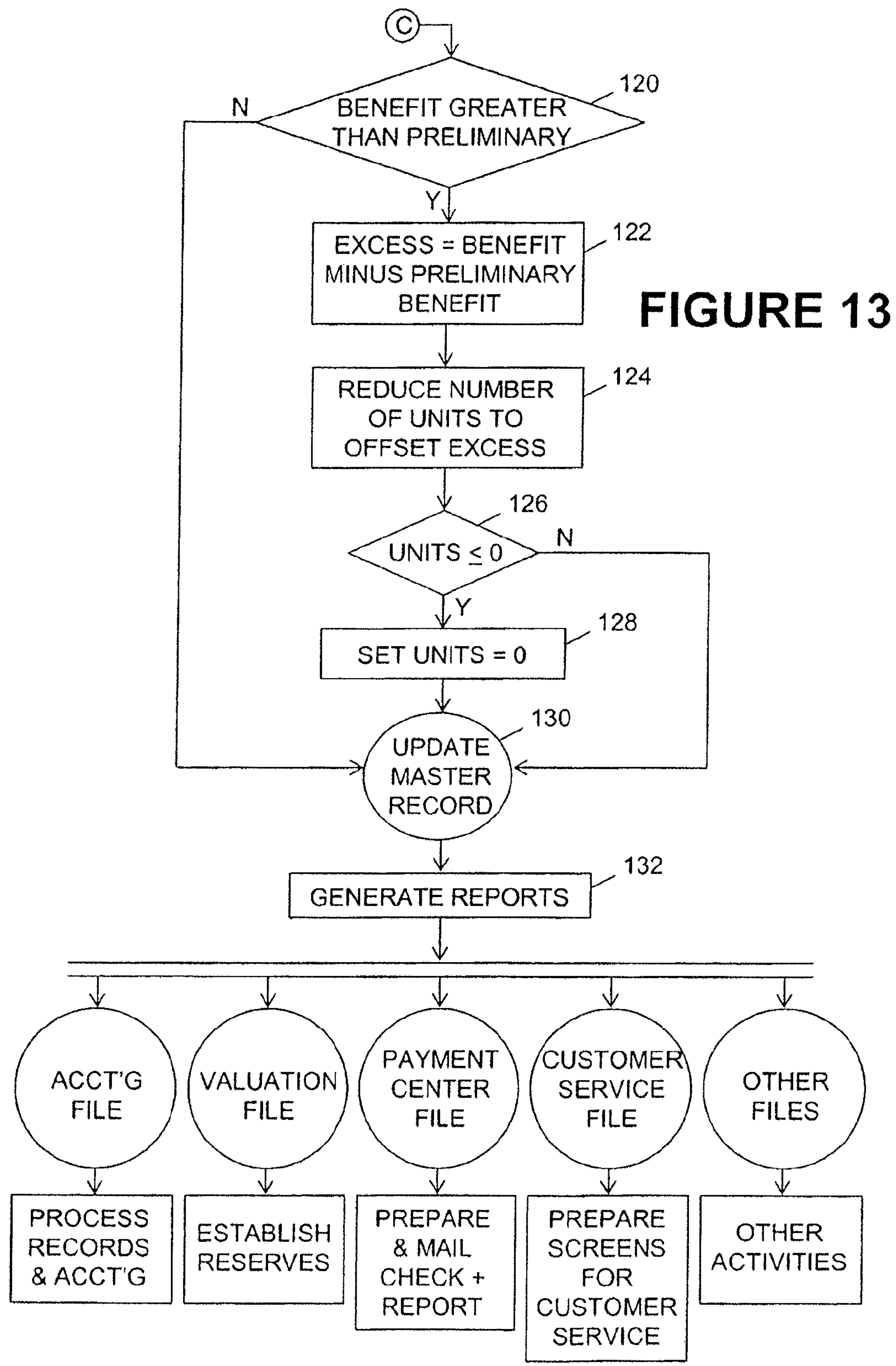
FIG. 13 shows a flow chart which is a continuation of the flow chart of FIG. 12.

FIGS. 12 and 13 illustrate one embodiment of a computerized process which utilizes a prospective approach to determining benefit payments under a variable annuity contract. As indicated by the connecting letter "A" at the top of FIG. 12, the data collection process illustrated in FIG. 9 is applicable to, and precedes, the process of FIG. 12. Following collection and storage of the data per FIG. 9, the system retrieves additional data, as indicated by blocks 100 and 102 and FIG. 12. The additional data includes annuity factors and annuity unit values which are typically stored in files used for other purposes, and which are useful in the calculations to follow. The system then determines whether the particular annuity of interest is a new or existing annuity (block 104).

If the annuity is a new annuity, the process proceeds by deducting the premium load (if any) from the amount of money available for purchasing the annuity (block 106). Following this step, a minimum benefit is calculated (block 108). Determination of a minimum benefit in step 108 is substantially similar to determination of a minimum benefit in step 56 of FIG. 10. In the case of an existing annuity, processing proceeds from step 104 to calculation of an investment return (i) (block 110). The investment return calculated is for the most recent past period using annuity unit values retrieved in step 102.

In either event (i.e., with either a new or existing annuity), the process determines a preliminary benefit (block 112) in a manner which is substantially similar to determination of a preliminary benefit in step 62 of FIG. 10. Moreover, comparison of the preliminary benefit to the minimum benefit (where appropriate), and setting the "benefit" equal to the greater of the preliminary and minimum benefits (blocks 114, 116, and 118) proceeds in the process illustrated by FIG. 12 substantially similarly to the process of steps 64, 66, and 68 of FIG. 10.

As indicated by connecting letter "C," processing continues as illustrated in FIG. 13. The first step in this continued processing is to determine whether the benefit set in steps 116 or 118 is greater than the preliminary benefit determined in step 112 (block 120). If so, the process proceeds to calculate the excess of the benefit over the preliminary benefit (block 122). The process then proceeds to reduce the number of annuity units to be used in the determination of future benefits (i.e., calculate the number of units payable in future benefits). As described in additional detail elsewhere in this specification, the reduction of the number of units is calculated (block 124) using the amount of the excess benefit, the current annuity unit values, and the attained age annuity factors. Following this step, the process checks to see if the number of units to be used in calculating future benefits is less than zero (block 126). If so, the system sets the number of units equal to zero (block 128). In either event, the system updates the master record (block 130) to reflect the reduction or resetting of annuity units. As indicated by the flow chart of FIG. 13, if the benefit determined by the process of FIG. 12 is not greater than the preliminary benefit, the system proceeds directly to step 130 (i.e., the number of annuity benefits is not reduced).

Following step 130, the system generates reports (block 132). This portion of the process is substantially similar to the portion of the process described in connection with steps 78-98 of FIG. 11, and the description of these steps will not be repeated here.

Figure 14:
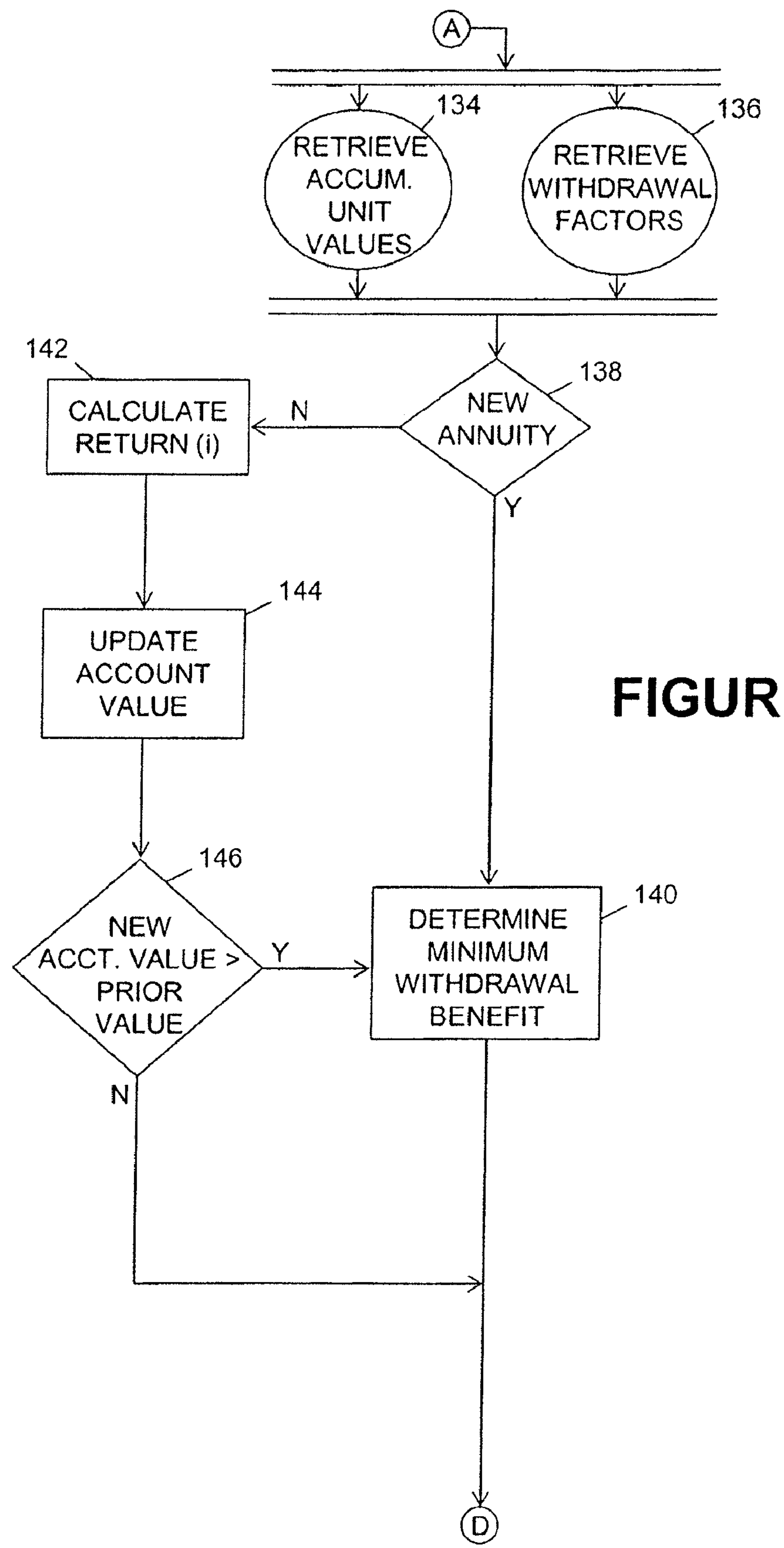
FIG. 14 shows a flow chart illustrating a portion of a computerized method for implementing a systematic withdrawal program.

FIG. 14 is a flow chart which illustrates a computer-based process for administering an annuity contract which utilizes a systematic withdrawal approach. As indicated by the presence of the connecting letter "A" at the top of the flow chart of FIG. 14, the initial steps of collecting and storing information relating to the annuity described previously in connection with FIG. 9 may be used in the embodiment of FIG. 14. Following these steps, and with reference to FIG. 14, the system first retrieves additional information relating to accumulation unit values (block 134) and withdrawal factors (block 136). These values are typically stored in files which may also be used for other purposes. The system first checks to see whether the subject annuity is a new or existing annuity (block 138). If new, the system proceeds to determine a minimum withdrawal amount, based upon the Account Value and withdrawal factor (block 140). If the subject annuity is an existing annuity, the system calculates the investment return, (i), for the most recent period (block 142), updates the Account Value (block 144) using the results of the calculation of step 142 and checks to see if the new Account Value is greater than the prior Account Value (block 146). If so, the process proceeds to step 140 to determine the minimum withdrawal benefit. If not, the system omits this step.

Figure 15:
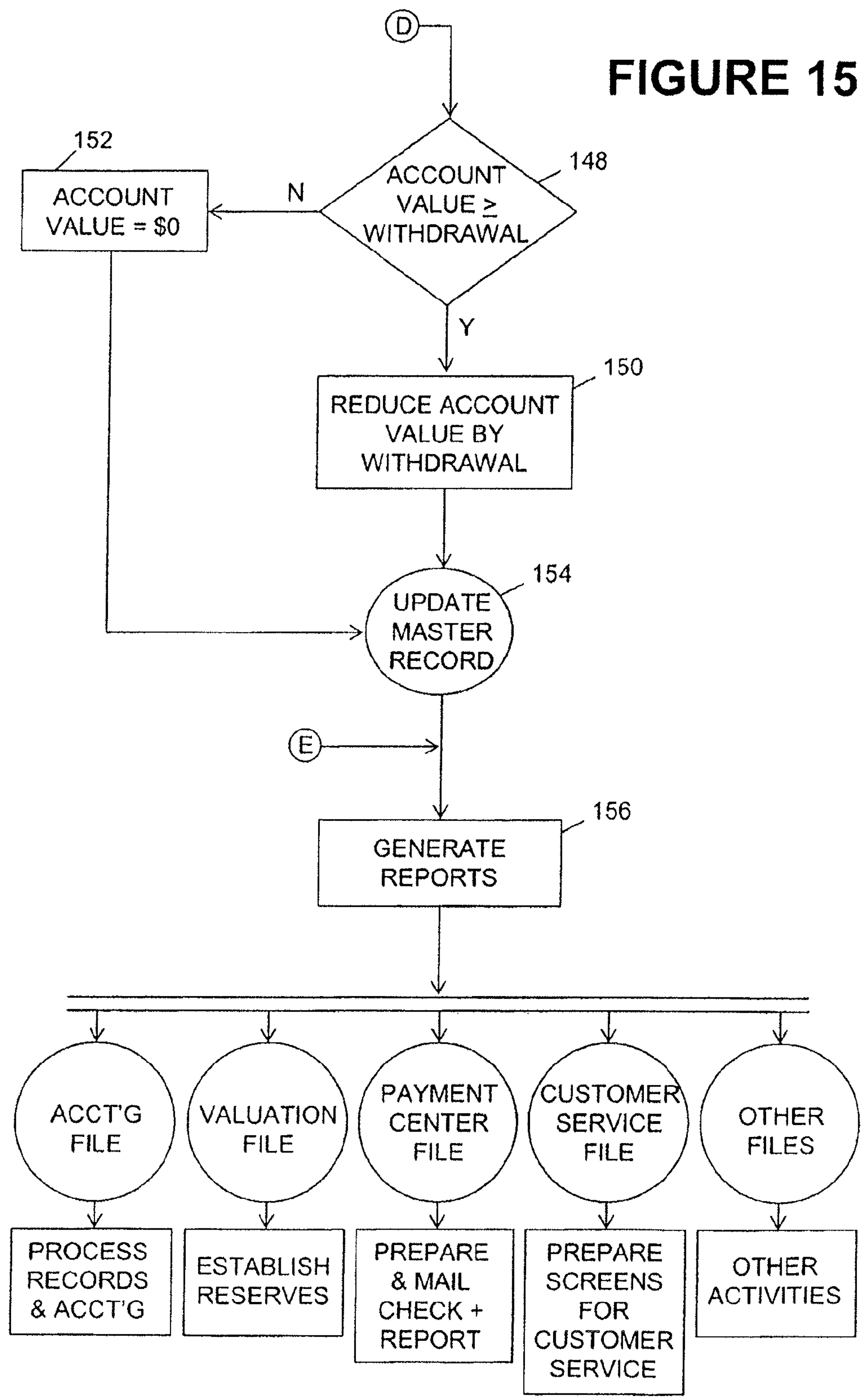
FIG. 15 shows a flow chart which is a continuation of the flow chart of FIG. 14.

As indicated by the connecting letter "D," the process proceeds in accordance with the embodiment illustrated by the flow chart of FIG. 15. In general, this portion of the process makes adjustments, when appropriate, to allow benefit calculations to be made by or on the next benefit payment date.

With reference to FIG. 15, the system first checks to see if the Account Value is greater than the withdrawal benefit (block 148). If so, the Account Value is reduced by the amount of the withdrawal benefit (block 150). If not, the Account Value is set equal to zero (block 152). Following either adjustment, the system proceeds to update the master record (block 154). As with the retrospective and prospective approaches, items updated in the master record include withdrawal benefit amount, new Account Value or remaining units, dates of payments, upcoming due dates, etc. Following updating of the master record, the system generates reports (block 156). Generation and handling of reports proceeds in substantially similar fashion to that described previously in connection with steps 78-98 of FIG. 11. Accordingly, that description will not be repeated here. In either case, the process of generating reports includes the step of updating any and all files relating to the subject benefit/withdrawal payment.

Figure 16:
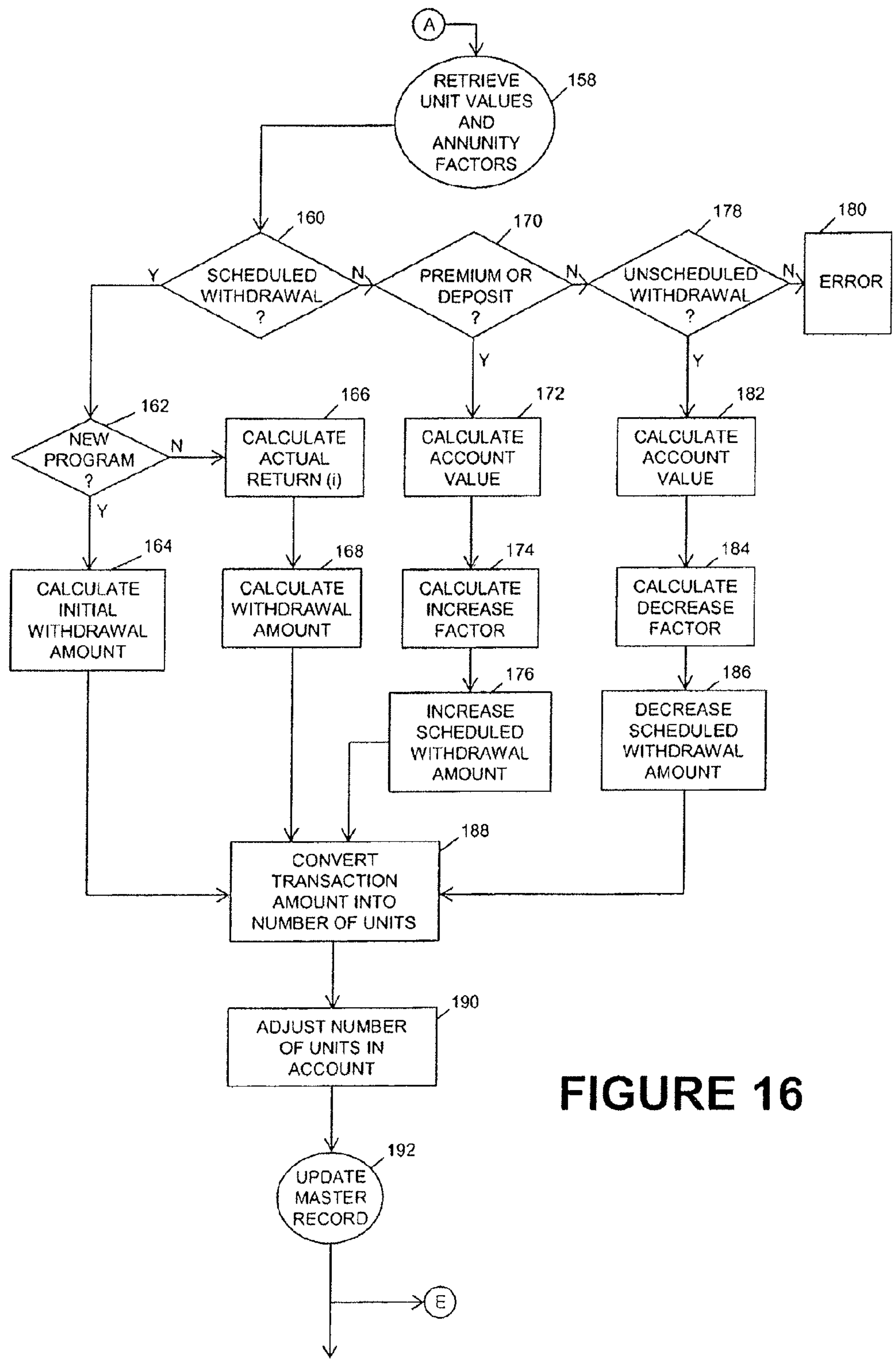
FIG. 16 shows a flow chart illustrating a computerized method which provides for scheduled and unscheduled withdrawals in an investment program, in accordance with one aspect of the present invention.

FIG. 16 illustrates an alternative embodiment of an annuity-based retirement program constructed in accordance with the present invention. As indicated by the continuation letter "A" at the top of the flow chart of FIG. 16, this embodiment shares the data collection steps illustrated in FIG. 9 in common with the preceding embodiments. Similar information regarding the annuitant and account is collected in accordance with the steps described in connection with FIG. 9. Additional information specific to the present embodiment, such as length of the liquidity period, is also entered in accordance with the steps described in connection with FIG. 9.

With reference to FIG. 16, the process continues by retrieving additional data (block 158), such as annuity unit values, annuity factors, and survivor factors. These values are typically stored in files which may be used for other purposes, as well.

Following the data retrieval step, the system determines whether a particular withdrawal is a scheduled withdrawal (block 160). If yes, the system then checks to determine if the withdrawal program is a new program (block 162). If yes, the system proceeds to calculate the initial withdrawal amount (block 164) based upon the data inputted for the new account. If the account is not a new program, the system calculates the actual net investment return, i, (block 166). The system then calculates the new withdrawal amount (block 168), using the actual net investment return and the AIR.

If the subject withdrawal is not a scheduled withdrawal, the system checks to determine whether the withdrawal is a premium payment or deposit (i.e., is a negative withdrawal) (block 170). If yes, the system calculates the current account value (block 172), calculates the increase factor (block 174) using the formulas described below, and increases the scheduled withdrawal amounts to be used in future calculations (block 176).

If the subject event is not a scheduled withdrawal and is not a premium payment or deposit, the system checks to confirm that it is an unscheduled withdrawal (block 178). If the system indicates that this is not the case, an error message is produced (block 180) and the process halts. If the system confirms that the event is an unscheduled withdrawal, processing proceeds with calculation of the current account value (block 182), calculation of the decrease factor (block 184), as described previously, and decrease of the scheduled withdrawal amount to be used in the future (block 186).

As indicated in the flow chart of FIG. 16, after completion of the appropriate steps described above, the system converts the transaction amount (i.e., the amount of the scheduled withdrawal, premium payment, deposit, or unscheduled withdrawal) into an equivalent number of units, using the current unit value (block 188). The system then adjusts the number of units in the account (block 190). The master records is then updated (block 192). As indicated by the connecting letter "E", the system then updates the files and generates reports in the same manner as described in connection with the previously discussed embodiments of the invention.

From the preceding description of the preferred embodiments, it is evident that the objectives of the invention are attained. Although the invention has been described and illustrated in detail, it is to be clearly understood that the same is intended by way of illustration and example only and is not to be taken by way of limitation. The spirit and scope of the invention are to be limited only by the terms of the appended claims.

What is claimed is:

1. A computerized method for administering an unannuitized variable annuity plan having a guaranteed minimum payment feature associated with a systematic withdrawal program, and for periodically determining an amount of a scheduled payment to be made to the owner under the plan, comprising the steps of:

a) using a computer, storing data relating to a variable annuity account, including data relating to an account value, a withdrawal rate, and a period of benefit payments;

b) using the computer, determining an amount of the scheduled payment;

c) using the computer, periodically determining the account value associated with the plan and making the scheduled payment by withdrawing that amount from the account value;

d) using the computer, monitoring for an unscheduled withdrawal made under the plan and adjusting the amount of the scheduled payment in response to said unscheduled withdrawal; and e) periodically paying the scheduled payment to the owner for the period of benefit payments, even if the account value is exhausted before all payments have been made, wherein scheduled payments made after the account value is exhausted can be made without the aid of the computer.

2. The method of claim 1, wherein the amount of the scheduled withdrawal payment is determined by the following formula:

$$\text{Scheduled Payment}=\text{Account Value}_o\times\text{WD Rate}$$

Where: Scheduled Payment=dollar amount of the scheduled payment

Account $\text{Value}_o$=initial account value or account value as periodically determined at a subsequent time WD Rate=predetermined % rate established as part of the annuity plan.

3. The method of claim 1, wherein the account value is periodically determined by the following formula:

$$\text{Account Value}_{t+1}=\text{Max}[(\text{Account Value}_t-\text{Withdrawal}),0]\times(1+i)$$

Where: Account $\text{Value}_{t+1}$=account value at time t+1

Account $\text{Value}_t$=account value at time t

Withdrawal=dollar amount of the scheduled payment at time t i=net fund performance during period t to t+1.

4. The method of claim 1, wherein the scheduled payment is adjusted in response to an unscheduled withdrawal according to the following formula:

$$\text{Scheduled Payment}'=\text{Scheduled Payment}\times(1-\text{USWithdrawal}_t/\text{Account Value}_t)$$

Where: Scheduled Payment'=scheduled payment after an adjustment for an unscheduled withdrawal Scheduled Payment=scheduled payment prior to an adjustment for an unscheduled withdrawal US $\text{Withdrawal}_t$=unscheduled withdrawal made at time t Account $\text{Value}_t$=account value at time t, prior to the unscheduled withdrawal.

5. The method of claim 1, further comprising the additional step of creating a master record for the variable annuity account, and wherein said storing steps include storing data on said master record.

6. The method of claim 5, wherein the step of creating a master record comprises the steps of providing an input screen having fields for entry of data relating to the owner, the type of annuity plan, relevant dates and amounts, and data relating to interest and mortality guarantees, entering data in the fields, and checking the data for validity and completeness.

7. The method of claim 6, further comprising the additional step of displaying the master record for visual checking by an operator, and storing the master record if the data is deemed to be satisfactory.

8. The method of claim 1, further comprising the additional step of generating a report, and forwarding the report to the owner.

9. The method of claim 1, further comprising the additional steps of generating at least one report, and storing data in at least one of an accounting file for use in preparing process and accounting records, a valuation file for use in establishing reserves, a payment center file for use in preparing benefit checks and reports for the owner, and a customer service file for use in preparing screens for use by customer service personnel.

10. The method of claim 1, wherein the period of benefit payments is a lifetime period.

11. A computerized method for administering an unannuitized variable annuity plan having a guaranteed minimum payment feature associated with a systematic withdrawal program, and for periodically determining amounts of scheduled payments to be made to the owner under the plan, comprising the steps of:

a) using a computer:

1) storing data relating to a variable annuity account, including data relating to an account value, a withdrawal rate, and a period of benefit payments;

2) determining an amount of the scheduled payments;

3) periodically determining the account value associated with the plan and making a scheduled payment by withdrawing that amount from the account value;

4) monitoring for an unscheduled withdrawal made under the plan and adjusting the amount of the scheduled payments in response to said unscheduled withdrawal; and 5) periodically comparing the account value to the amount of the scheduled payments and determining whether the account value is insufficient to make the scheduled payments for the period of benefit payments; and b) if the account value is insufficient to make the scheduled payments for the period of benefit payments, setting the account value to zero and making the scheduled payments, with or without the aid of the computer, for the period of benefit payments.

12. The computer method of claim 11, wherein the period of benefit payments is a lifetime period.

13. A computerized method for administering an unannuitized variable annuity plan having a guaranteed minimum payment feature associated with a systematic withdrawal program, and for periodically determining amounts of scheduled payments to be made to the owner under the plan, comprising the steps of:

a) using a computer:

1) storing data relating to a variable annuity account, including data relating to an account value, a withdrawal rate, and a period of benefit payments;

2) determining an amount of the scheduled payments;

3) periodically determining the account value associated with the plan and making a scheduled payment by withdrawing that amount from the account value;

4) monitoring for an unscheduled withdrawal made under the plan and adjusting the amount of the scheduled payments in response to said unscheduled withdrawal; and 5) periodically comparing the account value to the amount of the scheduled payments and determining whether the account value is insufficient to make the scheduled payments for the period of benefit payments; and b) if the account value is insufficient to make the scheduled payments for the period of benefit payments, continuing to make the scheduled payments, with or without the aid of the computer, for the period of benefit payments.

14. The computer method of claim 13, wherein the period of benefit payments is a lifetime period.

* * * * *